Sept. 8, 1936. A. L. BARNES 2,053,689
METHOD OF STEREOSCOPIC PROJECTION
Filed Jan. 5, 1934 3 Sheets-Sheet 1

Witnesses:
E. E. Wessels
Aaita E. Nelsen

Inventor:
Allen L. Barnes,
By Joshua R. H. Potts
his Attorney.

Sept. 8, 1936.  A. L. BARNES  2,053,689
METHOD OF STEREOSCOPIC PROJECTION
Filed Jan. 5, 1934  3 Sheets-Sheet 2
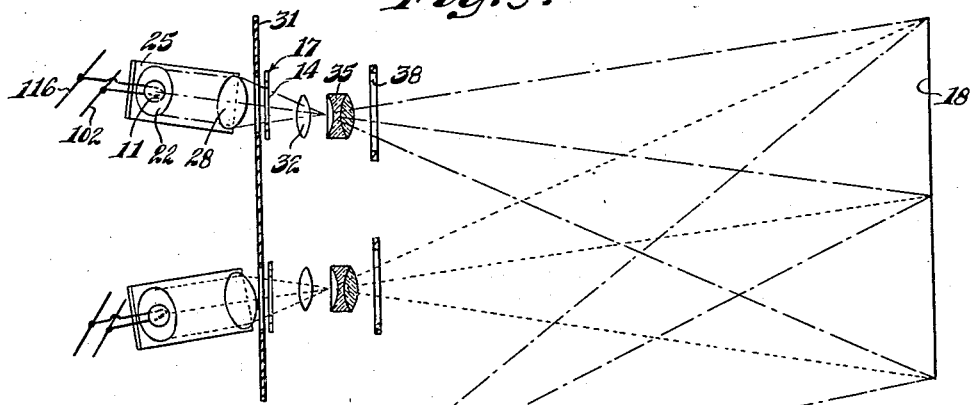
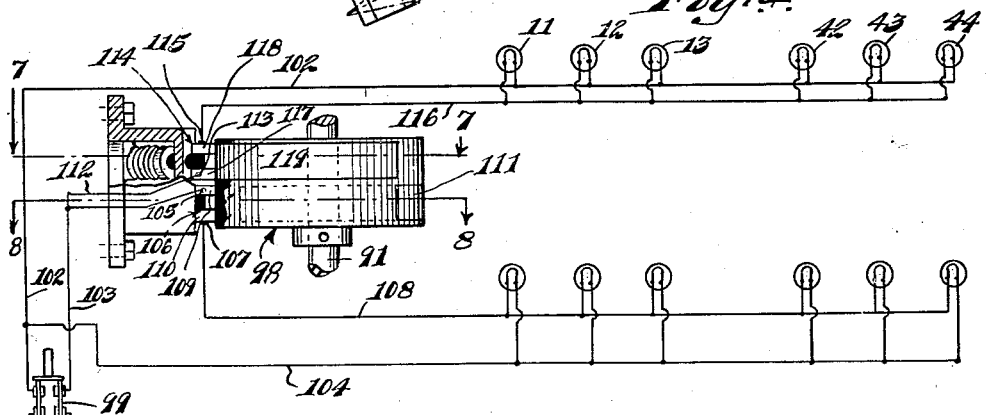
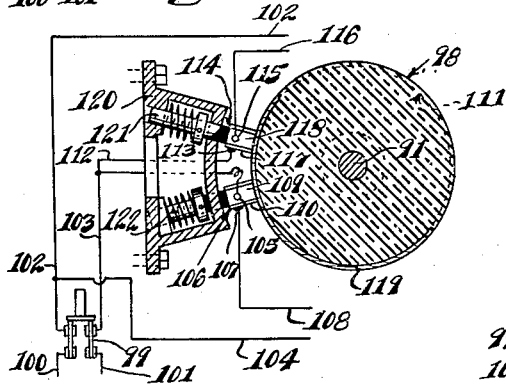
Witnesses:
E. E. Wessels
Aneta E. Nelson
Inventor:
Allen L. Barnes,
By Joshua R. H. Potts
his Attorney.

Sept. 8, 1936.  A. L. BARNES  2,053,689
METHOD OF STEREOSCOPIC PROJECTION
Filed Jan. 5, 1934  3 Sheets-Sheet 3
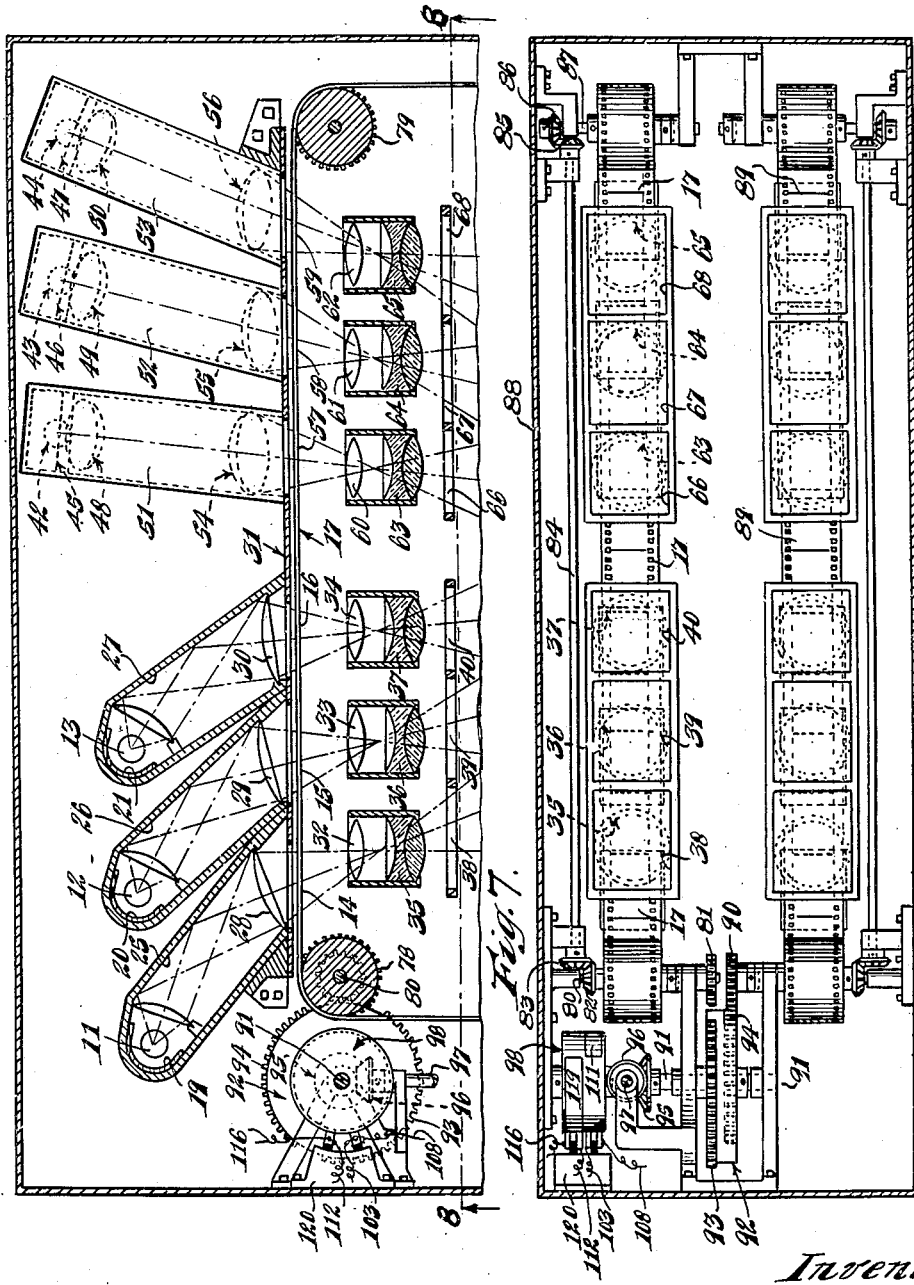
Witnesses:
C. E. Wessels
Aata E. Matson
Inventor:
Allen L. Barnes,
By Joshua R. H. Potts
his Attorney.

Patented Sept. 8, 1936

2,053,689

UNITED STATES PATENT OFFICE 2,053,689

METHOD OF STEREOSCOPIC PROJECTION

Allen L. Barnes, Oak Park, Ill., assignor, by direct and mesne assignments, to Joseph H. Hinshaw, trustee, Wilmette, Ill.

Application January 5, 1934, Serial No. 705,342

1 Claim. (Cl. 88—16.6)

My invention relates to method of stereoscopic projection, and especially third dimension motion pictures and third dimension motion pictures in natural colors; my method has the advantages and objects hereinafter pointed out.

In this invention I propose further to increase the illumination for projection and at the same time improve the projection by eliminating all flicker and dark intermissions caused by various shutters. I propose to do this by providing a method of projection by which pictures may be projected on the screen continuously, and I preferably accomplish this by employing synchronized projection light switches instead of the customary shutters.

My method is perfectly suited for producing pictures in color from records representing monochromes of the object photographed by superimposing a plurality of monochrome images on the projection screen; such superimposition by my method increases the illumination and is particularly advantageous to the use of polarized light.

Of course, if the superimposed images on the projection screen were viewed with the naked eye the phenomenon customarily called parallax is experienced and no stereoscopic effect can be gained. However, as before stated, I employ analyzing means in front of the eyes so as to permit one eye to view only the rays of light which make up the image for that particular eye. Analogous analyzing means are employed for the other eye and permit only the light rays of the image having a different viewpoint to be viewed by that eye. I propose to use a pair of spectacles which are adapted to perform this analyzing function and may use Nicol's prism of Iceland spar or herapathite crystals or other polarizing means. The eye pieces in the spectacles to be worn are the analyzers and are only two transparent means of polarizing the light in different planes. The crystal eye piece for one eye is rotated 90 degrees on its axis from that for the other eye; that is, if the two eye pieces were so placed that both of them polarized light in parallel planes and then one of them were to be rotated through an angle of 90 degrees, it would polarize light in planes at 90 degrees to the plane of polarized light for the other eye piece. By polarizing light in planes at 90 degrees the light passing one cannot pass the other due to the peculiarity of light rays when plane polarized. I take advantage of this peculiarity and therefore use these spectacles as analyzers of the projected light, and as a result each eye will analyze only the light in the plane of polarization of its particular analyzer. Thus the light of the images photographed from two points of view are projected with light vibrating in planes at right angles and received respectively in like manner by analyzers; one eye views the image as from one viewpoint while the other eye views it as from a spaced viewpoint, and neither image interferes with the proper perception of the other image. True third dimension effect is gained and the images may be projected in their true colors and perceived in the same true colors.

Some attempts at stereoscopic projection have been made but the apparatus and methods heretofore devised have resulted in eye strain due to the fact that one eye only is permitted to view the image at one time. This eye strain is caused by the intermittent obliteration by a shutter of the view for one eye while the other eye is viewing the image as from one point of view. This constant interruption of the light reaching either eye is a strain on the rectifying nerves and produces headache; this is one reason why previous methods and apparatus of stereoscopic projection have been unsuccessful. My method eliminates this difficulty by making it possible for both eyes to view an image at all times, and since the conventional shutter of the ordinary projection machine is eliminated, the eyes are also considerably aided by the elimination of the objectionable flicker. Thus it is possible for an observer to view a motion picture and perceive the third dimension effect in absolute comfort and ease. If the images are projected in color instead of in monochrome the eyes of the observer will be additionally rested by the naturalness of vision in its true colors of light. Also the employment of a separate projection lamp for each color image will increase the illumination of the composite image on the projection screen to such an extent that small detail may be perceived easily and without effort on the part of the observer.

Other objects will appear hereinafter.

My invention may be best understood by reference to the accompanying drawings, in which:

Fig. 3 is a sectional diagrammatic view taken substantially on the line 5—5 of Fig. 1;

Fig. 4 is a diagrammatic plan of the electrical circuit and commutator means preferably employed by me in my projector;

Fig. 5 is a sectional view taken substantially on the line 7—7 of Fig. 4;

Fig. 6 is a sectional view taken substantially on the line 8—8 of Fig. 4;

Fig. 7 is a horizontal sectional plan of my projecting apparatus; and

Fig. 8 is a front elevational view with part of the housing in section, taken substantially on the line 10—10 of Fig. 7.

Figure 1:
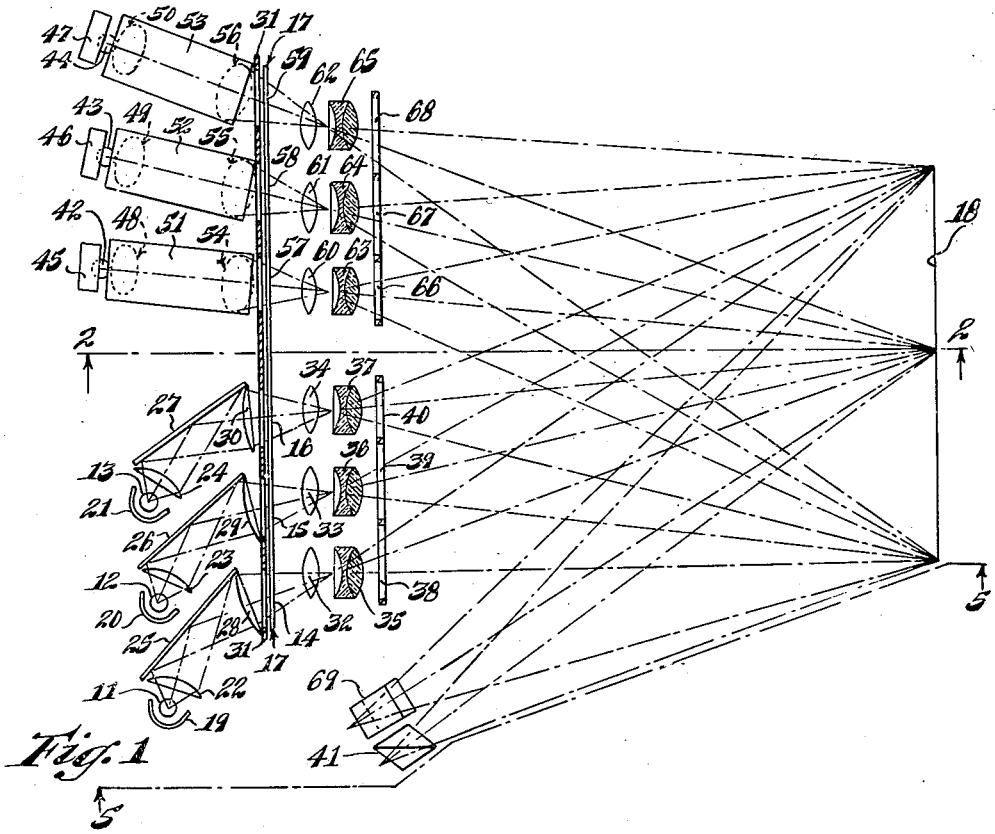
Fig. 1 is a plan diagrammatic view illustrating my projection apparatus and analyzing means.
Figure 2:
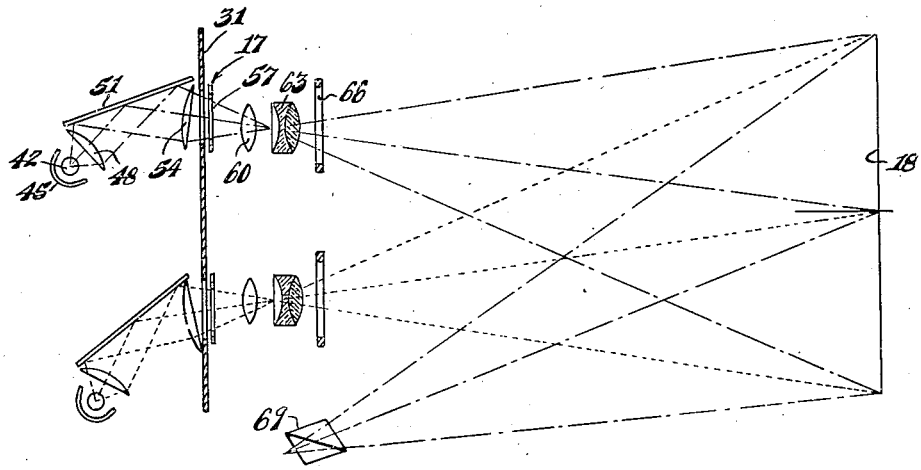
Fig. 2 is a sectional diagrammatic view taken substantially on the line 2—2 of Fig. 1.

Referring now to Figs. 1, 2, and 3, my method is shown diagrammatically and is especially adapted for use with film produced from exposure in my stereoscopic camera shown in my copending application, filed November 2, 1933, given Serial No. 696,313. Referring particularly to Fig. 1 my incandescent projecting lamps 11, 12, and 13 are employed for projecting light through frames 14, 15, and 16 of film 17. The projection frames 14, 15 and 16 are spaced apart on film 17 so that a projection frame separates frames 14 and 15, and frames 15 and 16. Thus frames 14, 15 and 16 are projected at one time and upon a subsequent movement of the film 17 the intermediate frames are projected. The alternate spacing of the frames and the alternate projection of them diminishes the necessary rectilinear motion of the film 17 between successive projections. These three frames just mentioned are projected simultaneously and thrown upon screen 18 and present superimposed images of the object which was photographed from one point of view. Condensing reflectors 19, 20, and 21 are employed for directing the light rays of the projecting lamps through condensing lenses 22, 23, and 24 which make the rays parallel. The parallel light rays from the condensing lenses just mentioned are thence reflected at the angle of polarization by highly polished, unsilvered reflecting surfaces 25, 26, and 27. The reflecting surfaces just mentioned polarize the light rays in parallel planes and reflect them through condensing lenses 28, 29, and 30, from which the light rays pass through film frames 14, 15, and 16 respectively.

A framing plate 31 is preferably employed for framing the light rays for passage through the various film frames.

The monochrome images formed by the passage of light rays through the various film frames are transmitted by lenses 32, 33, and 34 to projecting lenses 35, 36, and 37 respectively. As before stated the images are monochrome images of the various colors photographed and in order to project the images in the original color I preferably interpose color filters 38, 39, and 40 between lenses 35, 36, and 37 respectively and screen 18 so as to cause the monochrome images transmitted by lenses 35, 36, and 37 to be projected in the colors for which they are records and superimposed upon screen 18. My preferred method and apparatus for producing color film are also disclosed in an application filed by me on September 22, 1933, given Serial No. 690,555, and entitled "Method and apparatus for photography and projection." The light rays of the colored image on screen 18 are then received by my analyzing means or Nicol's elongated rhombohedron prisms of Iceland spar 41. Since the light rays reflected by reflecting surfaces 25, 26, and 27 are polarized in the same parallel planes as analyzing means 41 will polarize light, the light rays pass to the eyes of the observer and he observes the photographed image of the object in color as viewed from one viewpoint.

To produce third dimension or stereoscopic effect it is of course necessary to project an image of the object photographed simultaneously from a spaced point of view for observation by the other eye. For this purpose I preferably employ incandescent projecting lamps 42, 43, and 44 and condense their rays by condensing reflectors 45, 46, and 47. The light rays pass through condensing lenses 48, 49, and 50, respectively and emerge parallel and are reflected by plane polarizing means 51, 52, and 53 respectively. The polarizing means just mentioned are similar in all respects to polarizing means 25, 26, and 27. Polarizing means 25, 26, and 27 are rotated about the axis of the incident light 90 degrees relative to said last mentioned polarizing means. By so arranging polarizing means 51, 52, and 53, the light rays from the projection lamps are polarized in planes at an angle of 90 degrees to the planes of polarized light rays reflected by polarizing means 25, 26, and 27. From polarizing reflectors 51, 52, and 53, the light rays are reflected through condensing lenses 54, 55, and 56, pass through framing plate 31, through film frames 57, 58, and 59. The monochrome images formed by projecting the light through the various frames are transmitted by lenses 60, 61, and 62 to projecting lenses 63, 64, and 65. The images transmitted by said projecting lenses are in monochrome and in order to project the images in original colors, the light rays from said projecting lenses are passed through color filters 66, 67, and 68 similar to those used in photographing records and received on screen 18. The plurality of images are superimposed on screen 18 and reproduce an image in original colors of the object photographed from a point of view spaced from the point of view from which the images projected by projecting lenses 35, 36, and 37 were photographed. The superimposed images on screen 18 which are projected for observation by the left eye are received by polarizing means or Nicol's prism 69 which permits passage of light rays polarized in the same planes and thus for the left eye, but the light rays from the image for the right eye are not permitted to pass polarizing means 69 since said image is polarized in planes at 90 degrees to the planes of polarization of polarizing means 69.

As before stated, one of my objects is to increase illumination which is lost with the ordinary projection machine when the various film frames are advanced and a shutter is employed to conceal such advancement and eliminate blurring. While it is not discernible to the human eye, the shutter of the ordinary projecting machine periodically shuts off the light from the projecting lamp. I propose to eliminate the shutter and project one series of frames while another series is being advanced. In order to accomplish this I extinguish the projecting lamps employed for one series of frames while the projecting lamps for the other series are lighted. In this way projection is virtually continuous instead of being periodically interrupted by a shutter. I preferably employ commutator means for effecting the instantaneous and practically simultaneous extinguishment of one series of projecting lamps and the lighting of the other series of projecting lamps.

In projecting images in color and in stereoscopic effect I preferably employ a multiplicity of films, the exposure of which is set out in detail in my application entitled "Camera and method of photography," Serial No. 696,313, filed November 2, 1933. As there stated I record a multiplicity of images of the same subject desired to be photographed from one point of view and simultaneously record a multiplicity of images of the subject from a spaced point of view. Each of the images is a monochrome record of one color of the subject and by superimposing the plurality of images in projection I am able to reproduce the desired color effects of the subject. In my apparatus and method disclosed in said application I preferably expose one series of frames of one film during the time another film having a series of frames is being advanced to position for exposure. The apparatus there disclosed employs a shutter which is adapted to cover each film during its period of advancement, but in the present projection machine I eliminate any shutter means by employing the above mentioned commutator means.

In projecting the film described in the paragraph immediately above, it is necessary to employ duplicate projecting means and polarizing means and consequently I arrange projecting means and polarizing means immediately below the projecting means described in Fig. 1 which are similar in all respects to the projecting means described in connection with Fig. 1 for projecting another film while the upper film is being shifted and advanced for a subsequent projection of other images of the moving object. Figs. 2 and 5 illustrate in side elevation the relative positions of the upper and lower rows of projecting means and polarizing means employed for the left and right eyes respectively. For synchronously advancing and projecting said upper and lower films I preferably employ the means above mentioned and hereinafter set out in detail.

Referring now to Figs. 7 and 8, the upper film 17 is carried and advanced by intermittently moving sprockets 78 and 79. Sprocket 78 is keyed to a vertical shaft 80 which has a spur gear 81 keyed adjacent its lower end and a bevel gear 82 keyed adjacent its upper end. A bevel gear 83 is keyed to a horizontal shaft 84 and meshes with gear 82 for the purpose of driving shaft 84. A bevel gear 85 is keyed to the opposite end of shaft 84 and meshes with a bevel gear 86 which is keyed to a shaft 87 on which sprocket 79 is keyed. Appropriate bearing supports for shafts 80, 84, and 87 are anchored to the walls of housing 88. A similar arrangement of parts is provided for advancing lower film 89, and spur gear 90 is the gear which is intermittently driven to cause the intermittent actuation of the lower advancing mechanism.

A vertical shaft 91 is anchored in appropriate bearings which are supported by the walls of housing 88 and has keyed thereto a mutilated gear 92 which has an upper set of teeth 93 and a lower set 94. As can be seen particularly the teeth 93 and 94 will drive gears 81 and 90 at staggered periods of time. A bevel gear 95 is keyed to shaft 91 and adapted to be driven by a drive bevel gear 96 which is keyed to a power shaft 97. A commutator generally indicated at 98 is keyed to shaft 91 and adapted to cause the intermittent extinguishment and lighting of the projection lamps employed with the upper film 17 and lower film 89.

The electrical circuits and commutator may be more easily understood by referring to Figs. 4, 5, and 6. A lighting switch 99 is introduced between power supply lines 100 and 101, and supply lines 102 and 103. A wire 104 is electrically connected with supply wire 102 and one contact of lower projection lamps. The supply wire 102 is electrically connected with one contact of the upper row of projection lamps. Wire 103 is electrically connected with one contact of switch 99 and with terminal 105 of a brush contact member 106. The other contact member 107 of the brush contact member 106 is electrically connected by wire 108 with the remaining contact members of the lower projection lamps. An upper brush 109 is separated from lower brush 110 by appropriate insulation material and when contact band 111 is moving on the ends of brushes 109 and 110 a circuit is closed to the lower projecting lamps. The contact band 111 is arranged on the periphery of the body of rotatable commutator 98 and thus causes the lower projection lamps to be lighted during substantially 180 degrees of the rotation of commutator 98. A wire 112 electrically connects wire 103 with contact 113 of brush contact member 114 and a contact member 115 is connected electrically by wire 116 with the remaining contact of upper projection lamps. Brushes 117 and 118 of brush contact member 114 are separated by appropriate insulation material and close a circuit to the upper projection lamps when contact band 119 bridges the gap between brushes 117 and 118 during rotation of commutator 98. The contact band 119 is arranged on the periphery of the commutator and extends through substantially 180 degrees of the periphery of the commutator; the contact bands 111 and 119 are placed opposite each other on commutator 98 and are arranged in separated vertical planes. It can thus be seen that when band 111 is closing a circuit to the lower projection lamps the circuit to the upper projection lamps is broken because the band 119 is not in contact with brushes 117 and 118. Likewise, when band 119 is closing a circuit to the upper projection lamps the lower lamps are extinguished because the band 111 is not in contact with brushes 109 and 110. The brush contact members 106 and 114 are supported by an appropriate bracket 120 which is anchored to the wall of housing 88 and said brush contact members are arranged for sliding movement toward commutator 98 and are urged toward said commutator by appropriate coil springs which bear against collars anchored on the slidable shafts 121 and 122 which support brush contact members 114 and 106, respectively.

Referring again to Fig. 8, it can be seen that the various frames of upper film 17 are being projected because contact band 119 is closing a circuit between brushes 117 and 118 to the upper projection lamps. Likewise, it will be noted that during this time the teeth 93 of mutilated gear 92 are not in mesh with the teeth of spur gear 81 and consequently film 17 is not in motion. However, the lower film 89 is being moved because the teeth 94 are in mesh with and driving spur gear 90. The lower projection lamps are not lighted because contact band 111 is not closing a circuit between brushes 109 and 110 to the lower projection lamps. However, as shaft 91 continues to rotate, the contact band 119 will leave brushes 117 and 118 and open the circuit to the upper projection lamps. At virtually the same moment that the upper projection lamps are extinguished the lower projection lamps will be lighted by contact band 111 closing the circuit between the brushes of brush contact member 106 to the lower projection lamps. When the upper projection lamps are extinguished the upper film will be advanced as soon as teeth 93 mesh with spur gear 81. (This will be at the moment that contact band 119 leaves brushes 117 and 118.) The advancement of the lower film will have been completed at substantially the same moment that contact band 111 reaches brushes 109 and 110 in its rotation.

As stated before the film best adapted for use in this stereoscopic projecting apparatus is made by exposure in my stereoscopic camera described in application filed November 2, 1933, and given Serial No. 696,313. As there stated, each of the films is advanced a total of six frames at one time and remains stationary during the advancement of the other film through a period of six frames. Since it is not necessary with this projection apparatus to employ a shutter the projection of one series of frames may be accomplished immediately after the projection of a series of frames in the other film has been completed. Any flicker and loss of illumination occasioned by the shutters employed in projection machines at the present time is thus avoided and more time is given for projection. This results in particular to the advantage of my stereoscopic projection machines since the amount of illumination is increased by the increased projection period and also added illumination due to superimposed projection by multiple light sources.

My apparatus illustrated has the projecting and polarizing means for one film arranged above the like means for the other film, but the projecting and polarizing means for one film may be easily arranged laterally of the like means for the other film so that both films may travel vertically instead of horizontally.

I have explained my invention in connection with the use of film which has been exposed in my apparatus described in my application for patent entitled, "Camera and method of photography," Serial No. 696,313, filed November 2, 1933. However, even though I preferably employ a multiplicity of films as they are described, any arrangement of frames on any number of films might be employed with a degree of success in order to obtain stereoscopic effect with the use of polarized light.

While I have shown and described my preferred method and form of construction I do not wish to be limited to the details of method or apparatus herein shown, but wish to avail myself of all variations of apparatus and method coming within the scope of the appended claim.

Having thus described my invention what I claim as new and desire to secure by Letters Patent is:

The method of projecting stereoscopic pictures in color, comprising projecting a series of film frames carrying images of a photographic subject protographed from one point of view and simultaneously projecting from the same film another series of film frames carrying images of said subject photographed from a spaced point of view, each of said series having each of its frames spaced away one frame from the closest frame in its respective series, filtering the light rays of said projected images with color filter means, advancing said film a number of frames projected during one projection, subsequently projecting the unprojected spacing frames, and simultaneously projecting a series of spaced frames on another film during the said last mentioned step of advancing said first mentioned film.

ALLEN L. BARNES.